Feb. 23, 1954    A. J. KRAMER    2,669,823
SUGAR CANE HARVESTER
Filed Dec. 1, 1950    2 Sheets-Sheet 1
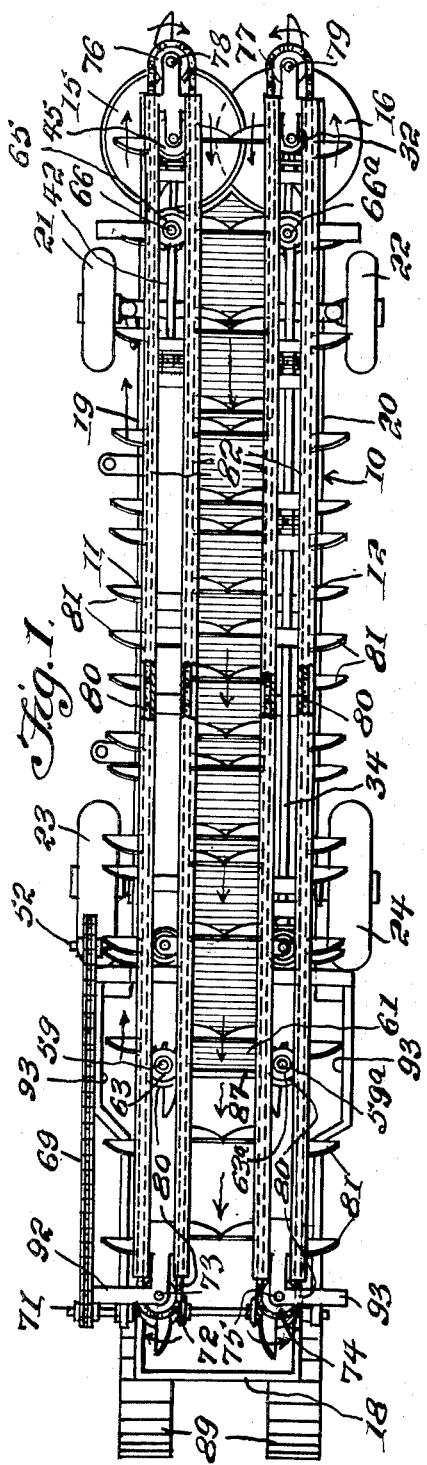
INVENTOR.
Anton J. Kramer,
BY Victor J. Evans & Co.
ATTORNEYS

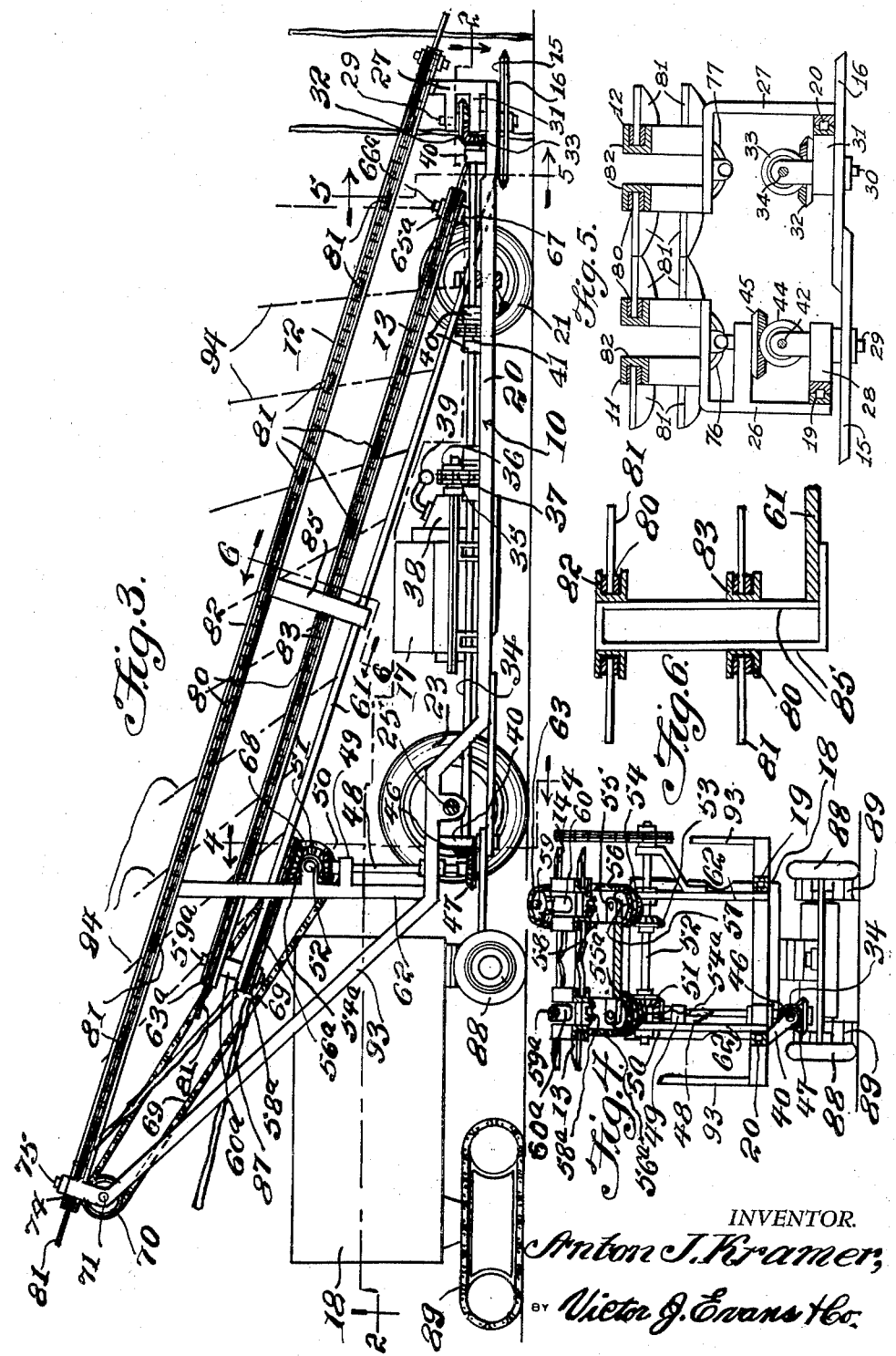

Patented Feb. 23, 1954

2,669,823

UNITED STATES PATENT OFFICE 2,669,823

SUGAR CANE HARVESTER

Anton J. Kramer, Fellsmere, Fla.

Application December 1, 1950, Serial No. 198,701

3 Claims. (Cl. 56—15)

This invention relates to harvesting implements particularly of the type used for harvesting sugar cane, and in particular this invention relates to pairs of vertically spaced conveyors carried by a platform with rotary knives suspended at the forward end of the platform and with the conveyors positioned whereby an upper set of conveyors, which travels at a higher speed than a lower set grips the sugar cane before it reaches the cutting knives and after the cane is cut the conveyors drop the stalks into a wagon following the platform.

The purpose of this invention is to provide a sugar cane harvester wherein the cane is removed from the stools, conveyed upwardly, and deposited in horizontal positions into a wagon without the cane contacting the ground.

Various types of sugar cane harvesters have been provided wherein the cane is cut and dropped, or conveyed to carrying wagons and trucks but in harvesters of this type feeding and conveying rollers are used and where cane is handled in this manner the stalks are damaged. With this thought in mind this invention contemplates an improved method of handling sugar cane between cutting knives and carrying wagons or trucks which includes upper and lower pairs of cane conveyors wherein the upper conveyors travel at a higher speed than the lower conveyors so that the cane is progressively turned from vertical to horizontal positions and handling and packing the cane in wagons, trucks and the like is facilitated.

The object of this invention is, therefore, to provide means in a sugar cane harvester for turning the sugar cane from vertical to horizontal positions without driving the cane through feed rolls and the like.

Another object of the invention is to provide an improved sugar cane harvesting machine wherein the cane is suspended above the ground continuously so that it does not come into contact with dirt and other refuse.

A further object of the invention is to provide an improved sugar cane harvester which is of a simple and economical construction.

With these and other objects and advantages in view the invention embodies an elongated horizontally disposed platform mounted on wheels with rotating knives journaled in and suspended from the forward end of the platform and with spaced pairs of conveyors extended upwardly from the knives and positioned to carry cane cut from the stools upwardly to a point from which the cane may be dropped, in a horizontal position, into wagons and the like.

Other features and advantages of the invention will appear from the following description taken in connection with the drawings wherein:

Figure 1 is a plan view illustrating the general arrangement and construction of the harvester.

Figure 2 is a sectional view taken on line 2—2 of Figure 3 showing the platform of the harvester with the conveyors omitted.

Figure 3 is a side elevational view of the harvester with parts broken away and shown in section.

Figure 4 is a cross section through the harvester taken on line 4—4 of Figure 3 and illustrating the conveyor driving means on the rear end of the platform.

Figure 5 is a cross section taken on line 5—5 of Figure 3 showing the mounting means of the rotating knives on the forward end of the platform.

Figure 6 is an enlarged sectional view taken on line 6—6 of Figure 3 showing the upper and lower guides for the conveyor chains.

Figure 7 is a diagrammatic view illustrating the travel of the cane through the harvester wherein the cane is turned from a vertical to a horizontal position.

Referring now to the drawings wherein like reference characters denote corresponding parts the improved sugar cane harvester of this invention includes a platform 10, upper conveyors 11 and 12, lower conveyors 13 and 14, cutting knives 15 and 16, a motor 17 positioned on the platform, and a wagon 18.

The platform, which is generally indicated by the numeral 10 is provided with side rails 19 and 20 and the forward ends of the rails are mounted on wheels 21 and 22 with the rear ends, which extend upwardly as shown in Figure 3, mounted on wheels 23 and 24 of an axle 25.

The cutting knives 15 and 16 are mounted in brackets 26 and 27 at the forward end of the platform, the knife 15 being journaled in the bearing 28 of the shaft 29 and the knife 16 being mounted on a shaft 30 that is journaled in a bearing 31. The shaft 30 is provided with a beveled gear 32 that meshes with a bevel pinion 33 on a shaft 34, which extends longitudinally of the platform and the shaft is driven from the motor 17 by a belt 35 that is trained over pulleys 36 and 37. The motor 17 is provided with a transmission 38 from which a handle 39 extends and by this means the speed of the conveyors may be changed as desired. The shaft 34 is journaled in bearings 40 on the side rails 20 of the platform and a sprocket 41 on the shaft drives a counter shaft 42 which is journaled in bearings 43 on the side rail 19. The shaft 42 is provided with a bevel pinion 44 that meshes with a bevel gear 45 on the shaft 29 providing means for driving the knives from the shaft 34 with the knife 15 traveling in a clockwise direction and with the knife 16 traveling in a counter-clockwise direction.

The rear end of the shaft 34 is provided with a bevel gear 46 which meshes with a similar gear 47 on a vertical shaft 48, which is journaled in bearings 49 and the bevel gear 50 on the upper end of the shaft 48 meshes with a gear 51 on a shaft 52 which drives the upper ends of the conveyors.

A beveled gear 53 on the shaft 52 meshes with a gear 54 on a vertically disposed shaft 55 and a chain 56 drives an upper vertically disposed shaft 59 through sprockets 57 and 58. A similar arrangement is provided on the opposite side of the machine with the gear 51 meshing with a gear that drives a shaft 55a and the shaft 55a drives a shaft 59a through a chain 56a over sprockets 57a and 58a.

The sprockets of the lower conveyor are mounted on the vertically disposed shafts 59 and 59a which provide driving means for the lower chain or conveyor. The shaft 52 is also provided with a sprocket 68 over which a chain 69 is trained and the opposite end of the chain is trained over a sprocket 70 on the shaft 71 which is journaled in bearings in the upper part of the frame.

The shaft 71 provides driving means for the upper conveyors 11 and 12 with a sprocket 72 on the conveyor 11, which is mounted on a shaft 73 being driven from the shaft 71 through suitable bevel gears and with a sprocket 74 on a shaft 75 at the upper end of the conveyor 12 also driven from the shaft 71 by a suitable bevel gear.

The lower ends of the conveyors 11 and 12 are provided with sprockets 76 and 77 which are mounted on shafts 78 and 79, respectively.

The conveyors are formed with endless chains 80 and arms 81 extend outwardly from the chains as illustrated in the drawings.

The conveyors on each side of the harvester are provided with channels providing continuous guides as illustrated in Figure 6 wherein the guides 82 are provided for the upper conveyors 11 and 12 and similar guides 83 are provided for the lower conveyors 13 and 14. The guides are supported from the frame 61 by brackets 85 which extend from both sides thereof.

The frame 61 includes a plate that supports the lower ends of the stalks of cane in travel and the lower end of this plate, as illustrated in Figure 2 extends downwardly to the under surfaces of the cutting knives 15 and 16. The frame 61 extends upwardly to the point 87 from which the cane drops into the wagon 18.

The wagon 18 is provided with wheels 88 at the front and endless traction chains 89 may be provided at the rear.

The wagon is attached to the rear end of the platform 10 by a tongue 90 with the forward end of the tongue attached by a pin 91.

The shaft 71 through which the sprockets at the upper end of the upper conveyors are carried is supported from the rear end of the frame 10 by braces 92 and 93, as shown in Figures 2 and 3 and it will be understood that the different parts may be supported by suitable means.

The harvester of this invention is drawn by a tractor and the platform is steered from the rear by suitable means.

As illustrated in Figure 7 the upper conveyors 11 and 12, which travel at a higher speed than the lower conveyors 13 and 14 cause the cane which is indicated by the numeral 94 to gradually fall rearwardly with the cane passing from a vertical position at the cutting end of the harvester and finally dropping into the wagon in a horizontal position.

The forward ends of the upper conveyors 11 and 12 extend beyond the cutting knives 15 and 16, as illustrated in Figure 3 whereby the cane is gripped by the arms 81 and it is continuously gripped by the same arms as it travels upwardly and until it is deposited into the wagon.

It will be understood that modifications may be made in the design and arrangement of the parts without departing from the spirit of the invention.

What is claimed is:

1. In a sugar cane harvester, the combination which comprises a platform carried by wheels, vertically spaced upper and lower pairs of endless chains having spaced arms extended therefrom positioned above the platform, sprockets journaled on the platform and over which said chains are trained, said sprockets positioned whereby the chains are inclined upwardly from the leading end of the platform and extend to points spaced beyond the trailing end of the platform whereby products carried upwardly by the arms extended from the chains are adapted to be dropped into a vehicle positioned at the rear of the platform, an inclined plate spaced below the lower pairs of chains upon which the lower ends of stalks of sugar cane slide, coacting horizontally disposed circular cutting knives journaled on the leading end of the platform and positioned between the leading ends of the upper and lower pairs of chains, a power unit mounted on the platform, and means operatively connecting the power unit to the cutting knives and chains.

2. In a sugar cane harvester, the combination which comprises a platform carried by wheels, vertically spaced upper and lower pairs of endless chains having spaced arms extended therefrom positioned above the platform, sprockets journaled on the platform and over which said chains are trained, said sprockets positioned whereby the chains are inclined upwardly from the leading end of the platform and extend to points spaced beyond the trailing end of the platform whereby products carried upwardly by the arms extended from the chains are adapted to be dropped into a vehicle positioned at the rear of the platform, an inclined plate spaced below the lower pairs of chains upon which the lower ends of stalks of sugar cane slide, coacting horizontally disposed circular cutting knives journaled in the leading end of the platform and positioned between the leading ends of the upper and lower pairs of chains, a power unit mounted on the platform, and means operatively connecting the power unit to the cutting knives and chains, the upper ends of the upper pairs of chains extending beyond the upper ends of the lower pairs of chains whereby stalks of sugar cane carried upwardly by the arms of the chains are turned to horizontal positions by the arms extended from the upper chains.

3. In a sugar cane harvester, the combination which comprises a platform carried by wheels, vertically spaced upper and lower pairs of endless chains having spaced arms extended therefrom positioned above the platform, sprockets journaled on the platform and over which said chains are trained, said sprockets positioned whereby the chains are inclined upwardly from the leading end of the platform and extend to points spaced beyond the trailing end of the platform whereby products carried upwardly by the arms extended from the chains are adapted to be dropped into a vehicle positioned at the rear of the platform, an inclined plate spaced below the lower pairs of chains upon which the lower ends of stalks of sugar cane slide, coacting horizontally disposed circular cutting knives journaled in the leading end of the platform and positioned between the leading ends of the upper and lower pairs of chains, power unit mounted on the platform, and means operatively connecting the power unit to the cutting knives and chains, said upper pairs of chains traveling at speeds greater than the speeds of the lower pairs of chains and the upper ends of the upper pairs of chains extended beyond the upper ends of the lower pairs of chains whereby products carried upwardly by the chains are turned to horizontally disposed positions as they are deposited into a vehicle.

ANTON J. KRAMER.

References Cited in the file of this patent

UNITED STATES PATENTS

| Number | Name | Date |
|---|---|---|
| 1,231,837 | Arndt | July 3, 1917 |
| 1,730,056 | Bradley et al. | Oct. 1, 1929 |
| 1,928,868 | Poen | Oct. 3, 1933 |
| 2,333,901 | Swenson | Nov. 9, 1943 |
| 2,375,846 | Houghton | May 15, 1945 |
| 2,442,520 | Van Sickle | June 1, 1948 |
| 2,481,462 | Woodland | Sept. 6, 1949 |